United States Patent
Takeuchi et al.

[11] Patent Number: 6,149,276
[45] Date of Patent: Nov. 21, 2000

[54] IMAGE PROJECTOR

[75] Inventors: Tadashi Takeuchi; Hiroshi Uchida, both of Tokyo, Japan

[73] Assignee: NEC Corporation, Tokyo, Japan

[21] Appl. No.: 09/235,759

[22] Filed: Jan. 25, 1999

[30] Foreign Application Priority Data

Jan. 28, 1998 [JP] Japan ................. 10-016073

[51] Int. Cl.⁷ .................................. G03B 21/14
[52] U.S. Cl. .................. 353/31; 353/34; 348/744; 348/750; 349/5; 349/8; 359/629; 359/637
[58] Field of Search ................. 353/31, 30, 34, 353/37, 38; 348/742, 744, 750, 756; 349/5, 8, 18; 359/629, 637, 640

[56] References Cited

U.S. PATENT DOCUMENTS

| | | | |
|---|---|---|---|
| 4,943,154 | 7/1990 | Miyatake et al. | 353/31 |
| 5,953,152 | 9/1999 | Hewlett | 359/298 |

FOREIGN PATENT DOCUMENTS

| | | |
|---|---|---|
| 0 646 828 | 4/1995 | European Pat. Off. . |
| 62-266532 | 11/1987 | Japan . |
| 2-196283 | 8/1990 | Japan . |
| 2-304518 | 12/1990 | Japan . |
| 3-62086 | 3/1991 | Japan . |
| 6-194595 | 7/1994 | Japan . |
| 6-202037 | 7/1994 | Japan . |
| 7-199181 | 8/1995 | Japan . |
| 7-301778 | 11/1995 | Japan . |
| 8-304739 | 11/1996 | Japan . |
| 9-113994 | 5/1997 | Japan . |
| 9-138369 | 5/1997 | Japan . |
| 9-325417 | 12/1997 | Japan . |
| WO 97/01786 | 1/1997 | WIPO . |

*Primary Examiner*—Safet Metjahic
*Assistant Examiner*—E P LeRoux
*Attorney, Agent, or Firm*—Young & Thompson

[57] ABSTRACT

There is provided an image projector including (a) a light source, (b) a reflection mirror for reflecting flux of light emitted from the light source, (c) an image display unit for forming images, and (d) a relay system for transferring the flux of light to the image display unit, the relay system including a relay lens having a first convex surface through which the flux of light enters therein and a second convex surface through which the flux of light exits therefrom, a ratio of a radius of curvature of the first convex surface to a radius of a curvature of the second convex surface being determined in such a manner that aberration out of an optical axis of the relay lens is increased to thereby cause a converging point of the flux of light to displace from a calculated focal distance. For instance, the ratio is determined in the range of about 1:2 to about 1:3. The relay lens preferably has a focal distance in the range of about 40 to 60 mm, and is made of material having an index of refraction in the range of about 1.5 to 1.65. The above-mentioned image projector increases aberration thereof. If a relay lens has greater aberration, a greater amount of flux of light is converged at a point spaced away from a focus in an optical axis of the relay lens. As a result, it is possible to compensate for non-uniformity in brightness, caused by dispersion in a converging point in a projection lens.

11 Claims, 12 Drawing Sheets

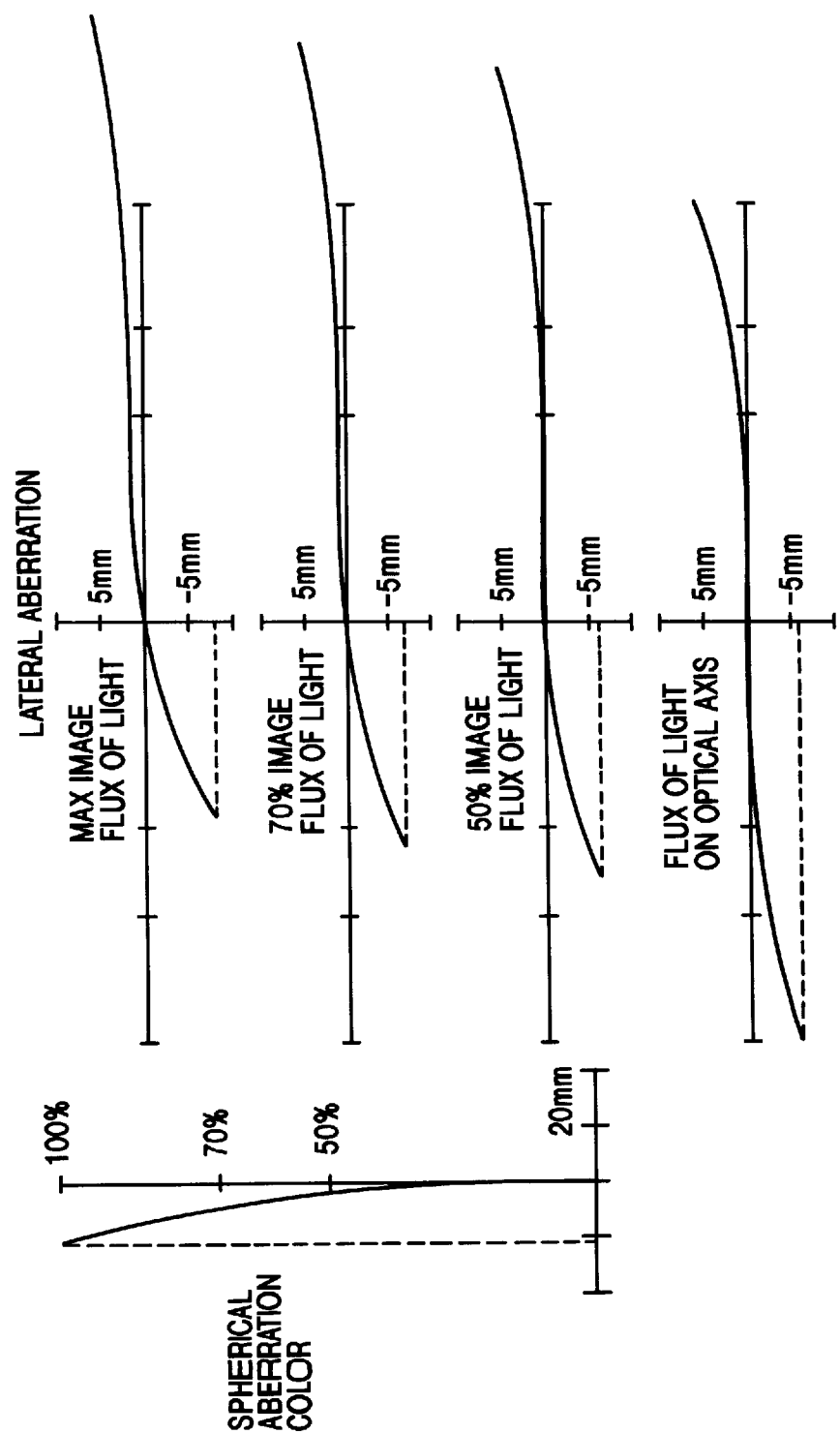

IMAGE PROJECTOR

BACKGROUND OF THE INVENTION

1. Field of the Invention

The invention relates to an image projector, and more particularly to an image projector including a liquid crystal display panel for receiving flux of light emitted from a light source located at the rear thereof, and projecting images in front thereof

2. Description of the Related Art

A conventional image projector is illustrated in FIG. 1. In the illustrated image projector, a light source 9 located at a focus of a reflection mirror 12 emits non-directional flux of light. The emitted flux of light is reflected at an inner surface of the reflection mirror 12 towards first to third image display units 2a, 2b and 2c. Specifically, a portion of flux of light is introduced into the first and second image display units 2a and 2b through an ordinary optical path 13, and a remainder of flux of light is introduced into the third image display unit 2c through a relay optical path 14.

For instance, each of the first to third image display units 2a to 2c is comprised of a liquid crystal display panel.

The flux of light passes through fly eye lenses 8a, 8b and a condensing lens 6 to thereby be diverged into some portions, and the thus diverged flux of light, that is, images of the fly eye lenses 8a and 8b are converged into a point.

Thus, the flux of light having reached the first to third image display units 2a, 2b, and 2c can have high brightness and uniformity in brightness in a screen. Since the flux of light emitted from the light source 9 has completely no polarizing components, polarizing components which could not pass through the first to third image display units 2a to 2c are turned into heat, which might cause a damage to the image display units 2a to 2c. To prevent the first to third image display units 2a to 2c from being damaged, a filter 7 is positioned between the fly eye lenses 8a, 8b and the condensing lens 6 to thereby remove polarizing components which are harmful to the first to third image display units 2a to 2c.

As an alternative, there may be used a part for separating polarizing components, converting a phase of the separated polarizing components, and re-combining the separated polarizing components with one another, in order to utilize polarizing components usually not used.

The flux of light emitted from the light source 9 is separated into three primary color components, that is, red (R), green (G), and blue (B), by means of first and second dichroic mirrors 11a and 11b. The thus separated red, green, and blue color components pass through the first, second, and third image display units 2a, 2b, and 2c, respectively. The first to third image display units 2a to 2c form images based on the red, green, and blue color components. A cross dichroic prism 1 combines the thus formed images into full-color image. The thus formed full-color image is projected onto a screen (not illustrated) through a projection lens 3 located adjacent to the cross dichroic prism 1.

The cross dichroic prism 1 has four outer surfaces. The projection lens 3 is positioned facing one of the outer surfaces of the cross dichroic prism 1, and the first to third image display units 2a to 2c are positioned facing the remaining outer surfaces, respectively, to thereby equalize a focal distance of the projection lens 3 to focal distances of the first to third image display units 2a to 2c.

Since the first and second image display units 2a and 2b are positioned relative to the first dichroic mirror 11a in mirror image relation, portions of the flux of light separated by the first dichroic mirror 11a run the same optical path length to the first and second image display units 2a and 2b, respectively.

On the other hand, a portion of the flux of light having passed through the second dichroic mirror 11b and directing to the third image display unit 2c has to run a longer optical path length than the optical path length for a portion of the flux of light to run towards the first or second image display unit 2a or 2b.

The fly eye lens 8a, 8b and the condensing lens 6 focus images of small lenses constituting the fly eye lenses 8a and 8b on the first and second image display units 2a and 2b. Accordingly, the optical path 14 to the third image display unit 2c has a focus offset from a focus of the optical path 13 to the first and second image display units 2a and 2b by a difference in an optical path length between the optical path 14 and the optical path 13. As a result, a portion of the flux of light having passed through the optical path 14 does not match in size to a screen of the third image display unit 2c, resulting in failure of uniform, efficient illumination.

To overcome this problem, first and second relay lenses 4 and 5 in an extension of the optical path 14 to the third image display unit 2c. The first and second relay lenses 4 and 5 enlarge and project the flux of light again, ensuring compensation for a width of the flux of light to thereby entirely cover the third image display unit 2c with the flux of light.

However, addition of the first and second relay lenses 4 and 5 causes another problem of a difference in optical characteristic between an ordinary optical path and a relay optical path. Herein, the term "an ordinary optical path" indicates an optical path in which flux of light reaches an image display unit without passing through a relay lens, and the term "a relay optical path" indicates an optical path in which flux of light reaches an image display unit via a relay lens. The above-mentioned problem is originated from a difference in brightness distribution between brightness of flux of light having passed the ordinary optical path and brightness of flux of light having passed the relay optical path.

Specifically, the flux of light emitted from the light source 6 is designed to be focused on an entrance pupil of the projection lens 3 by means of the condensing lens 6 in the first and second image display units 2a and 2b. On the other hand, since it is necessary to design the third image display unit 2c larger in size, the flux of light having passed the relay optical path in which the first and second relay lenses 4 and 5 are provided are not focused on an entrance pupil of the projection lens 3 in many cases.

In addition, aberration of the first and second relay lenses 4 and 5 causes the projection lens 3 to have a different tendency of focusing flux of light having passed the relay optical path from a tendency of focusing flux of light having passed the ordinary optical path.

Hence, only the third image display unit 2c is accompanied with a problem that uniformity in brightness of a screen on which images are focused is not ensured, resulting in non-uniform illumination for combined images comprising images having passed the relay optical path and images having passed the ordinary optical path.

As illustrated in FIG. 9, the first and second image display units 2a and 2b receiving flux of light having passed the ordinary optical path can have a brightness distribution where high brightness is found in almost entire area.

On the other hand, as illustrated in FIG. 10, the third image display unit 2c receiving flux of light having passed the relay optical path has a brightness distribution where a central area has a lower brightness than a brightness of an area around the central area, because of the above-mentioned aberration, a difference in optical length between the ordinary optical path and the relay optical path, and a difference in a position as to where images are focused on the projection lens 3.

Accordingly, if images are combined without any compensation, there would occur a difference in a brightness distribution in each color on a screen. As a result, three major colors, red, green and blue, are combined in unbalanced fashion, which would cause a problem that uniformity in color is not ensured in color combination on a screen.

It would be possible to focus flux of light on a location close to an entrance pupil by shortening a focal distance of each of the relay lenses 4 and 5. However, if a focal distance of each of the first and second relay lenses 4 and 5 is shortened, display magnification of the third image display unit 2c would be varied. This causes a problem that a display area to which images are focused might be too large or too small relative to a screen of the third image display unit 2c, resulting in shortage in brightness and uniformity in focusing images.

In order to overcome the above-mentioned problem, Japanese Unexamined Patent Publication No. 7-199181 (hereinafter, referred to as "first prior art") has suggested an image projector.

The first prior art includes a small-sized metal halide lamp having electrodes spaced away from each other by a distance in the range of 2.5 mm to 3.5 mm. Hence, the image projector as the first prior art can be small-sized, and also can have a bright screen.

In addition, since the first prior art includes a liquid crystal panel having a diagonal length of 2 inches or smaller, or having an area of about 1240 square millimeter or smaller, it is possible to reduce deterioration in a light-focusing rate on a panel. This ensures that sufficiently bright images can be focused on a screen.

However, the first prior art is accompanied with problems that it is quite difficult to space the electrodes from each other by a desired distance, and that it is also difficult to have uniform brightness on a screen.

Japanese Unexamined Patent Publication 9-113994 (hereinafter, referred to as "second prior art") has suggested a liquid crystal projector. The second prior art has almost the same object as that of the above-mentioned first prior art.

The liquid crystal projector suggested in the second prior art is comprised of a paraboloid mirror reflecting flux of light emitted from a light source, and turning the flux of light into parallel lights, an integrator lens including first and second convex lens groups each comprised of a plurality of convex lenses to which the parallel lights enter, an optical separator for separating the parallel lights having passed the integrator lens into lights having three major colors, first to third liquid crystal panels for optically modulating lights having been separated into three major colors by the optical separator, a dichroic prism for combining lights optically modulated by the first to third liquid crystal panels, and a projection lens for projecting the thus combined lights.

This liquid crystal projector is characterized by that optical lengths between the integrator lens and each of the first to third liquid crystal panels are designed equal to each other.

However, the second prior art is accompanied with problems that an arrangement of equalizing the optical lengths between the integrator lens and the liquid crystal panels restricts designability of other elements as to where they should be positioned, and that it is quite difficult to obtain uniform brightness on a screen similarly to the above-mentioned first prior art.

Japanese Unexamined Patent Publication No. 7-301778 has suggested an image projector including a projection lens comprised of a rear projection lens and a front projection lens, and means for combining hue, positioned between the rear and front projection lenses.

In accordance with the suggested image projector, parallel flux of light emitted from objects located on three display panels passes through parallel plates or a cross dichroic mirror, there does not occur coma-aberration. Hence, images are correctly focused on a screen.

Japanese Unexamined Patent Publication No. 8-304739 has suggested a polarizing illuminator including a light source emitting randomly polarized lights, a first lens plate comprising a plurality of rectangular condensing lenses for condensing lights emitted from the light source to thereby form a plurality of secondary light source images, and a second lens plate located in the vicinity of a location where the secondary light source images are formed.

In accordance with the suggested polarizing illuminator, polarized lights are separated when the first lens plate forms the minute secondary light source images. Hence, is would be possible to prevent spatial expansion of an optical path, which would be caused by separation of polarized lights. As a result, the polarizing illuminator can be fabricated in a smaller size.

Japanese Unexamined Patent Publication No. 9-138369 has suggested an image projector including a projection lens, and an optical system for combining colors. The projection lens is comprised of a first group of lenses and a second group of lenses, and the optical system is comprised of a transparent plate, dichroic mirrors, and a plain mirror. The second group of lenses is located between the optical system and polarizing beam splitters. A plane including a plane of the transparent plate, normal lines of dichroic mirrors, and an optical axis of the projection lens is designed perpendicular to a plane including normal lines of the polarizing beam splitters, and an optical axis of the projection lens.

SUMMARY OF THE INVENTION

In view of the above-mentioned problems of the prior art, it is an object of the present invention to provide an image projector which is capable of enhancing uniformity in brightness on a screen to which images are to be focused, and also enhancing uniformity in balance among colors when they are mixed together.

In one aspect of the present invention, there is provided an image projector including (a) a light source, (b) a reflection mirror for reflecting flux of light emitted from the light source, (c) an image display unit for forming images, and (d) a relay system for transferring the flux of light to the image display unit, the relay system including a relay lens having a first convex surface through which the flux of light enters therein and a second convex surface through which the flux of light exits therefrom, a ratio of a radius of curvature of the first convex surface to a radius of a curvature of the second convex surface being determined in such a manner that aberration out of an optical axis of the relay lens is increased to thereby cause a converging point of the flux of light to displace from a calculated focal distance.

It is preferable that the ratio is determined in the range of about 1:2 to about 1:3. It is also preferable that the relay lens is designed to have a focal distance in the range of about 40 mm to about 60 mm. It is further preferable that the relay lens is made of material having an index of refraction in the range of about 1.5 to about 1.65.

The reflection mirror may be of ellipsoid of revolution or paraboloid of revolution in shape.

In another aspect of the present invention, there is provided a relay lens to be employed in an image projector for transferring flux of light emitted from a light source, to an image display unit, the relay lens having a first convex surface through which the flux of light enters therein and a second convex surface through which the flux of light exits therefrom, a ratio of a radius of curvature of the first convex surface to a radius of a curvature of the second convex surface being determined in such a manner that aberration out of an optical axis of the relay lens is increased to thereby cause a converging point of the flux of light to displace from a calculated focal distance.

In accordance with the present invention, aberration of a relay lens, caused by a shape of a relay lens, is intentionally increased. If a relay lens has greater aberration, a greater amount of flux of light is converged at a point spaced away from a focus in an optical axis of the relay lens. As a result, it is possible to compensate for non-uniformity in brightness, caused by dispersion in a converging point in a projection lens.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 8A illustrates lateral aberration in flux of light in a conventional image projector.

FIG. 8B illustrates spherical aberration (longitudinal aberration) in flux of light in a conventional image projector.

DESCRIPTION OF THE PREFERRED EMBODIMENTS

Figure 1:
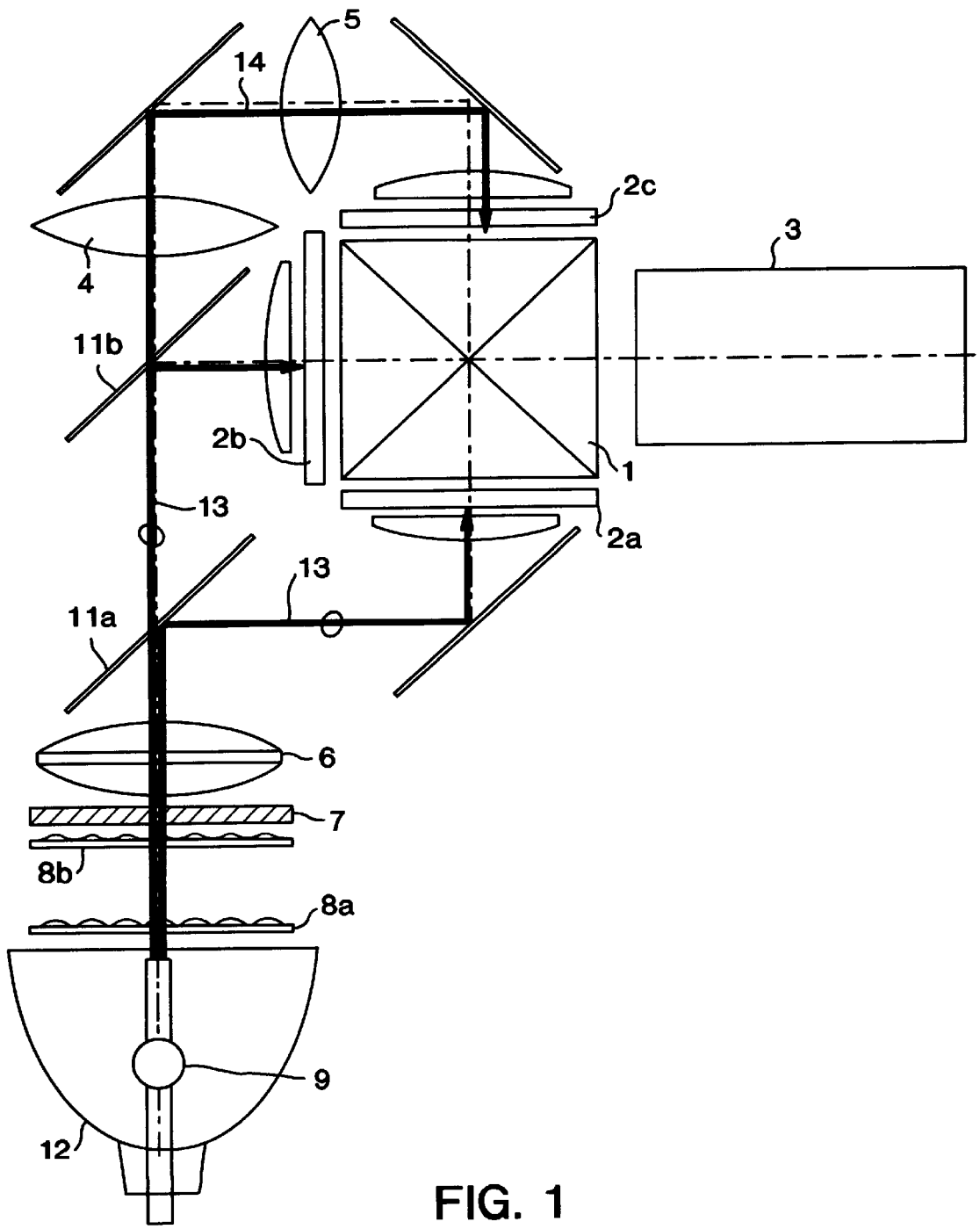
FIG. 1 illustrates a structure of an image projector to which the present invention is applied.
Figure 3:
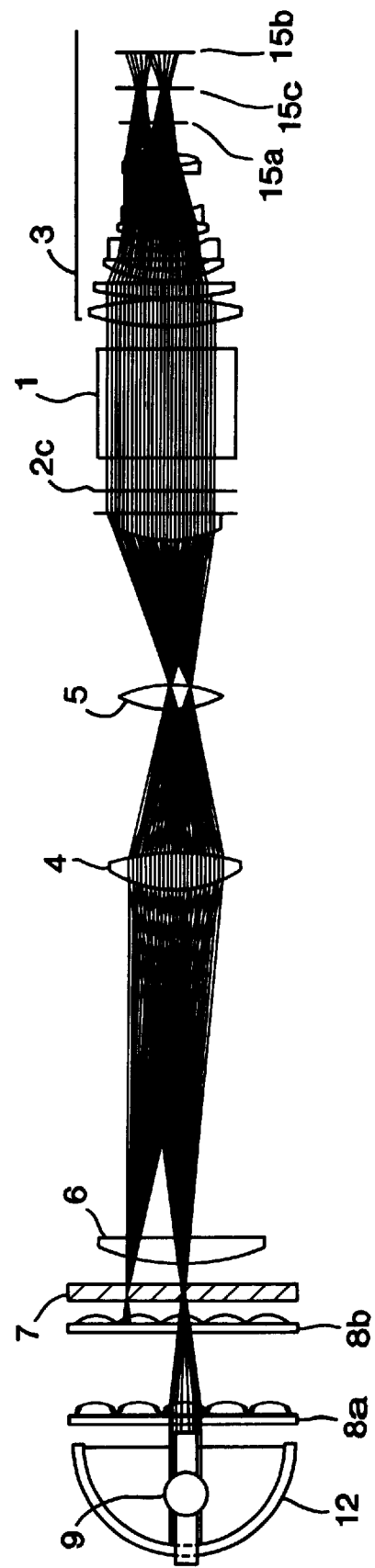
FIG. 3 illustrates an optical system in the image projector in accordance with the present invention.

FIG. 1 illustrates an image projector to which the first embodiment in accordance with the present invention is applied. FIG. 3 illustrates an operation of the first relay lens employed in the image projector illustrated in FIG. 1. FIG. 3 illustrates only the third image display unit 2c receiving flux of light having passed the relay optical path, and omits the first and second image display units 2a and 2b receiving flux of light having passed the ordinary optical path.

With reference to FIGS. 1 and 3, the image projector includes a light source 9 located at a focus of a reflection mirror 12 and emitting non-directional flux of light. The emitted flux of light is reflected at an inner surface of the reflection mirror 12 towards first to third image display units 2a, 2b and 2c. A portion of flux of light is introduced into the first and second image display units 2a and 2b through an ordinary optical path 13, and a remainder of flux of light is introduced into the third image display unit 2c through a relay optical path 14.

The flux of light passes through fly eye lenses 8a, 8b and a condensing lens 6 to thereby be diverged into some portions, and the thus diverged flux of light, that is, images of the fly eye lenses 8a and 8b are converged into a point.

A filter 7 is positioned between the fly eye lenses 8a, 8b and the condensing lens 6 to thereby remove polarizing components which are harmful to the first to third image display units 2a to 2c.

The flux of light emitted from the light source 9 is separated into three primary color components, that is, red (R), green (G), and blue (B), by means of first and second dichroic mirrors 11a and 11b. The thus separated red, green, and blue color components pass through the first, second, and third image display units 2a, 2b, and 2c, respectively. The first to third image display units 2a to 2c form images based on the red, green, and blue color components. A cross dichroic prism 1 combines the thus formed images into full-color image. The thus formed full-color image is projected onto a screen (not illustrated) through a projection lens 3 located adjacent to the cross dichroic prism 1.

The cross dichroic prism 1 has four outer surfaces. The projection lens 3 is positioned facing one of the outer surfaces of the cross dichroic prism 1, and the first to third image display units 2a to 2c are positioned facing the remaining outer surfaces, respectively, to thereby equalize a focal distance of the projection lens 3 to focal distances of the first to third image display units 2a to 2c.

First and second relay lenses 4 and 5 are located in the relay optical path. The first and second relay lenses 4 and 5 compensate for a difference in optical length between the ordinary optical path 13 and the relay optical path 14.

By varying the first and second relay lenses 4 and 5 in shape and material of which the relay lenses 4 and 5 are made, aberration of the relay lenses 4 and 5 is increased, ensuring that it is possible to control a point where flux of light is converged in the projection lens 3.

As a result, it is possible to control a brightness distribution on the third image display unit 2c receiving flux of light having passed the relay optical path 14, and further compensate for a difference in brightness distribution between the first and second image display units 2a and 2b both receiving flux of light having passed the ordinary optical path.

Hereinbelow are described detailed examples of the image projector in accordance with the present invention.

FIRST EXAMPLE

Optical elements constituting the first example of the image projector are listed in Table 1.

TABLE 1

|  | A | B | C |
|---|---|---|---|
| Reflection Mirror 12 | ※ 1 | −12 |  |
| Light Source 9 |  | 53 |  |
| First Fly Eye Lens 8a | Plane | 2.7 | Pyrex |
|  | ※ 2 | 3.4 | AIR |
| Second Fly Eye Lens 8b | Plane | 2.7 | Pyrex |
|  | ※ 3 | 1.2 | AIR |
| Polarizing Filter 7 | Plane | 4 | B270 |
|  | Plane | 10 | AIR |
| Condensing Lens 6 | 98 | 9 | B270 |
|  | −600 | 127.05 | AIR |
| First Relay Lens 4 | 37 | 15 | BK7 |
|  | −77 | 52.9 | AIR |
| Second Relay Lens 5 | 44 | 9.2 | F2 |
|  | −44 | 55.3 | AIR |
| Image Display Units 2a, 2b, 2c | Plane | 13.7 |  |

In Table 1, column "A" indicates a radius of curvature R in millimeters, column "B" indicates a distance between lens surfaces in millimeters, and column "C" indicates material of which each element is made.

Figure 4:
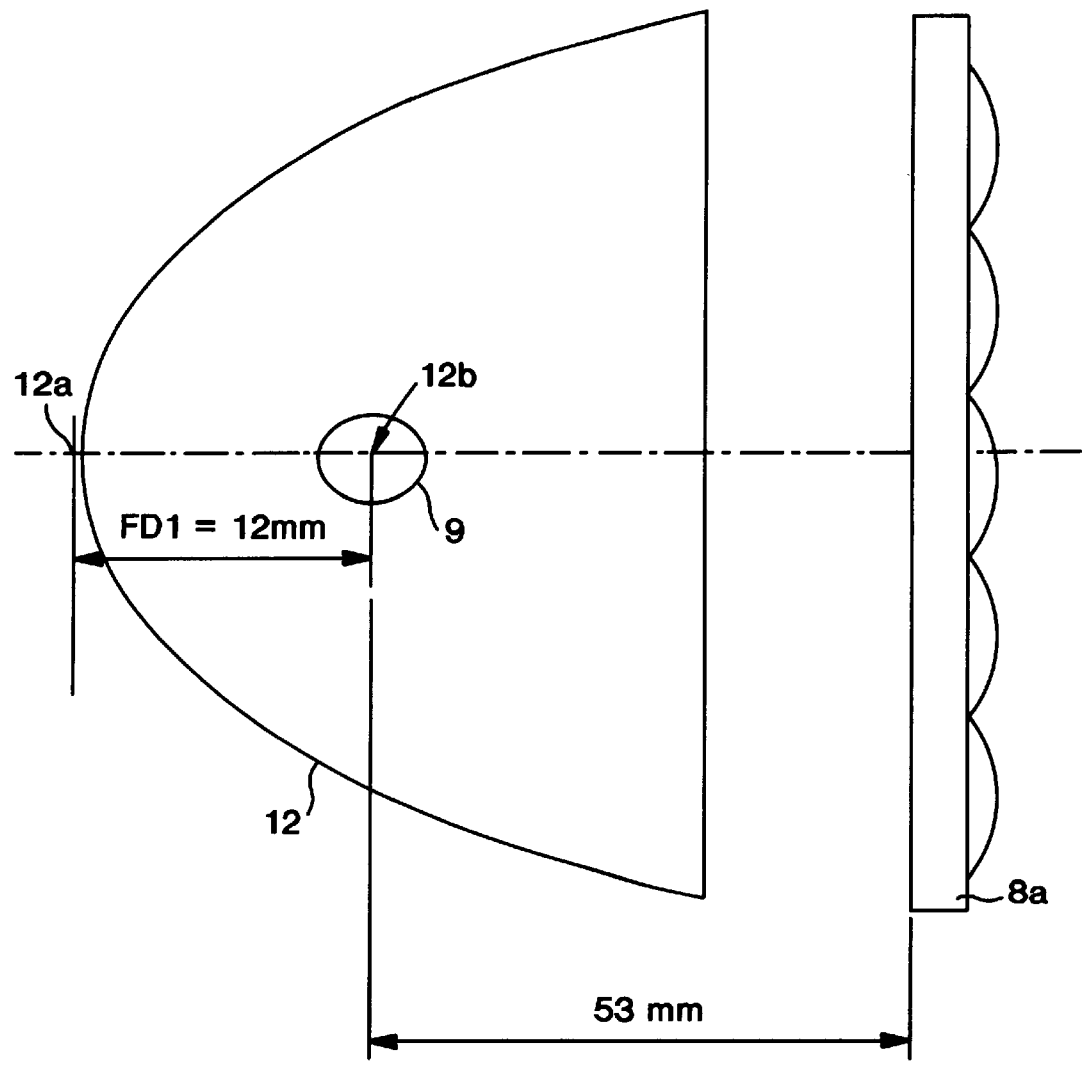
FIG. 4 is a cross-sectional view of a reflection mirror having a paraboloid of revolution.

In the first example, the reflection mirror 12 is designed to have ellipsoid of revolution (※ 1), as illustrated in FIG. 4. The reflection mirror 12 is designed to have a first focal distance FD1 of 12 mm, and a second focal distance of 650 mm. Herein, the first focal distance FD1 is defined as a distance between a bottom 12a and a first focus 12b, as illustrated in FIG. 4, and the second focal distance is defined as a distance between the bottom 12a and a second focus (not illustrated).

In the first example, the reflection mirror 12 is positioned relative to the first fly eye lens 8a so that the first focus 12b of the reflection mirror 12 is spaced away from the first fly eye lens 8a by 53 mm.

Figure 5A:
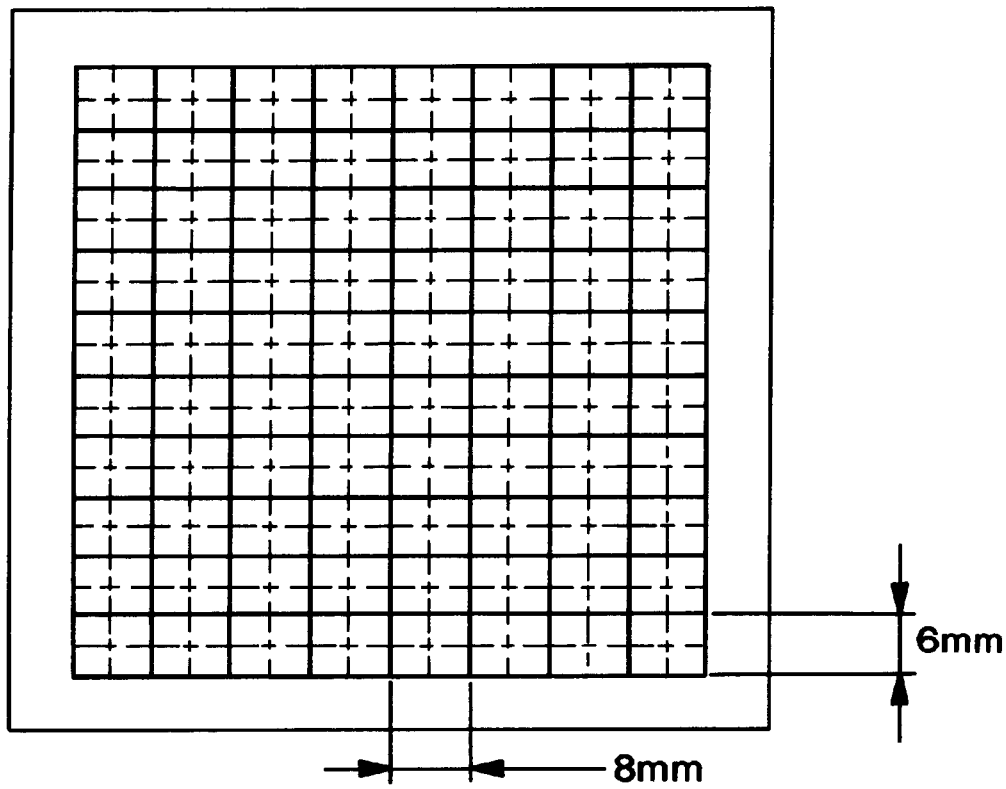
FIG. 5A is a top plan view of a fly eye lens.
Figure 5B:
FIG. 5B is a side view of the fly eye lens illustrated in FIG. 5A.

FIGS. 5A and 5B illustrate the first fly eye lens 8a employed in the first example (※ 2). The first fly eye lens 8a is comprised of eighty cells arranged in a matrix, as illustrated in FIG. 5A. The matrix includes ten rows each of which has eight cells (10×8 cells). Each of the cells in the first fly eye lens 8a is designed to have a radius of curvature R of 21 mm.

The second fly eye lens 8b employed in the first example has the same structure as that of the first fly eye lens 8a. Specifically, the second fly eye lens 8b is comprised of eighty cells arranged in a matrix, as illustrated in FIG. 5A. The matrix includes ten rows each of which has eight cells (10×8 cells). Each of the cells in the second fly eye lens 8b is designed to have a radius of curvature R of 21 mm.

Figure 2:
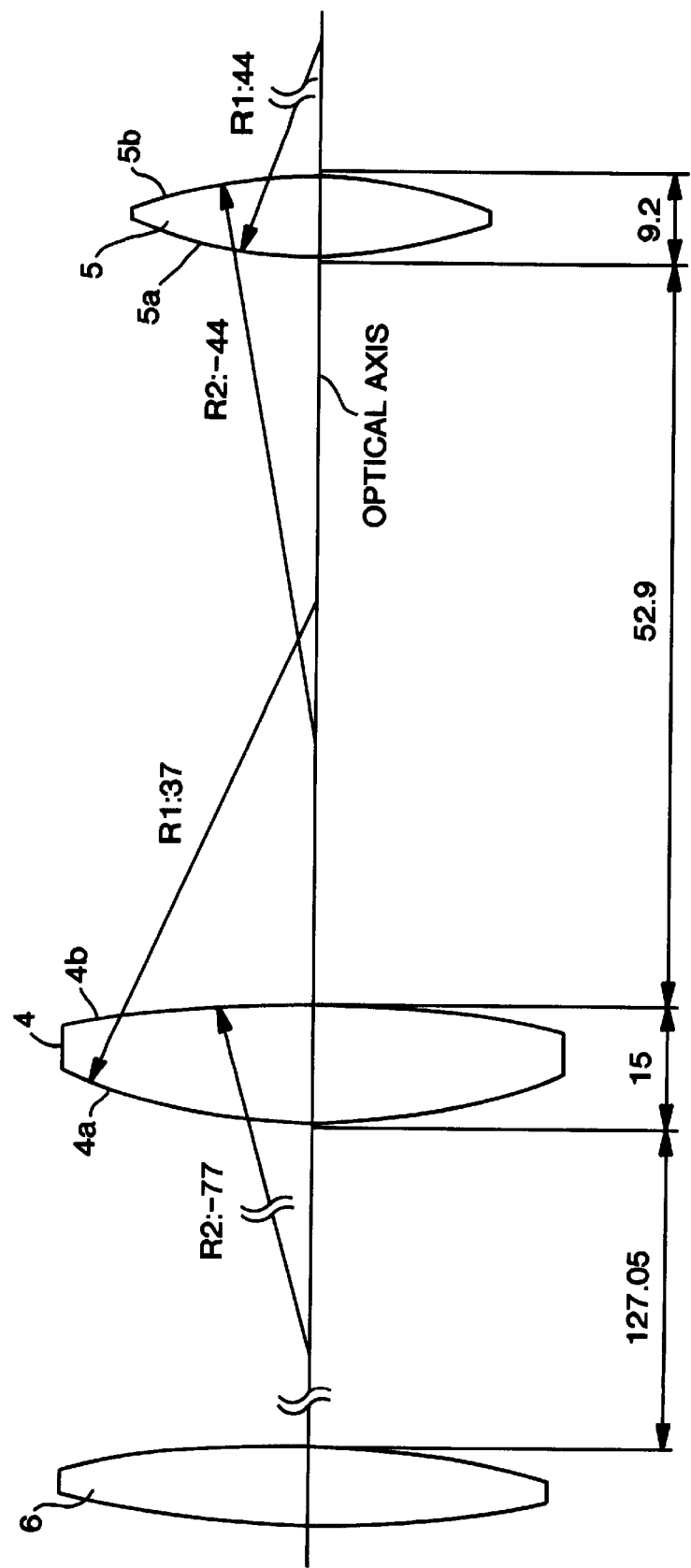
FIG. 2 illustrates the first relay lens and an optical system therearound.

FIG. 2 illustrates the first relay lens 4 employed in the first example, and an optical system around the first relay lens 4.

As shown in Table 1, the first relay lens 4 in the first example is made of glass BK7 having an index of refraction of 1.52. As an alternative to BK7, the first relay lens 4 may be made of material having an index of refraction in the range of about 1.5 to about 1.65.

The first relay lens 4 in the first example is designed to have a focal distance in the range of about 40 mm to about 60 mm.

In general, a relation among the focal distance f of a lens, radiuses of curvature R1 and R2 of opposite surfaces of a lens, and an aperture number N of a lens is defined as follows.

$$1/f = [(1/R1) - (1/R2)] \times (N-1)$$

As illustrated in FIG. 2, the first relay lens 4 is designed to have a radius of curvature R1 of 37 mm at a first convex surface 4a closer to the condensing lens 6, and a radius of curvature R2 of −77 mm at a second convex surface 4b closer to the second relay lens 5. That is, the first relay lens 4 is designed to have a ratio of a radius of curvature R1 of the first convex surface 4a to a radius of a curvature R2 of the second convex surface 4b, in the range of about 1:2 to about 1:3.

A distance between summits of the first and second convex surfaces 4a and 4b is designed to be 15 mm, and a distance between the second convex surface 4b of the first relay lens 4 and a closer surface of the second relay lens 5 is designed to be 52.9 mm.

The second relay lens 5 is designed to have a radius of curvature R1 of 44 mm at a first convex surface 5a closer to the first relay lens 4, and a radius of curvature R2 of −44 mm at a second convex surface 5b remoter from the first relay lens 4.

A distance between summits of the first and second convex surfaces 5a and 5b is designed to be 9.2 mm, and a distance between the second convex surface 5b of the second relay lens 5 and a surface of a lens (not illustrated) located adjacent to the second relay lens 5 is designed to be 55.3 mm.

The second relay lens 5 is made of glass F2. The second relay lens 5 is a conventional lens.

As illustrated in FIG. 4, the reflection mirror 12 in the first example is of ellipsoid of revolution in shape. As an alternative, the reflection mirror 12 may be of paraboloid of revolution in shape in dependence on characteristics of optical elements constituting an image projector.

The image projection in accordance with the first example operates as follows.

The light source 9 emits divergent flux of light, which is reflected at the reflection mirror 12. As a result, the flux of light is given a certain direction, and is forwardly reflected. Then, images of the light source 9 are focused on the second fly eye lens 8b by means of the first fly eye lens 8a.

Images of the fly eye lens 8a are focused on the first to third image display units 2a to 2c through the second fly eye lens 8b and the condensing lens 6.

In the first example, the first relay lens 4 is positioned at a location associated with the third image display unit 2c. The images of the light source 9 focused on the first relay lens 4 are projected onto the third image display unit 2c through the second relay lens 5 to thereby keep illumination. Since the first relay lens 4 is made of glass having a low index of refraction, specifically, 1.52, the spherical aberration in the relay optical path is increased. As a result, as illustrated in FIG. 3, a greater amount of flux of light is converged at a location 15c closer to the light source 9 than a calculated focus 15b of the relay optical path. Thus, the flux of light is converged closer to an entrance pupil 15a of the projection lens 3.

Figures 7A, 7B:
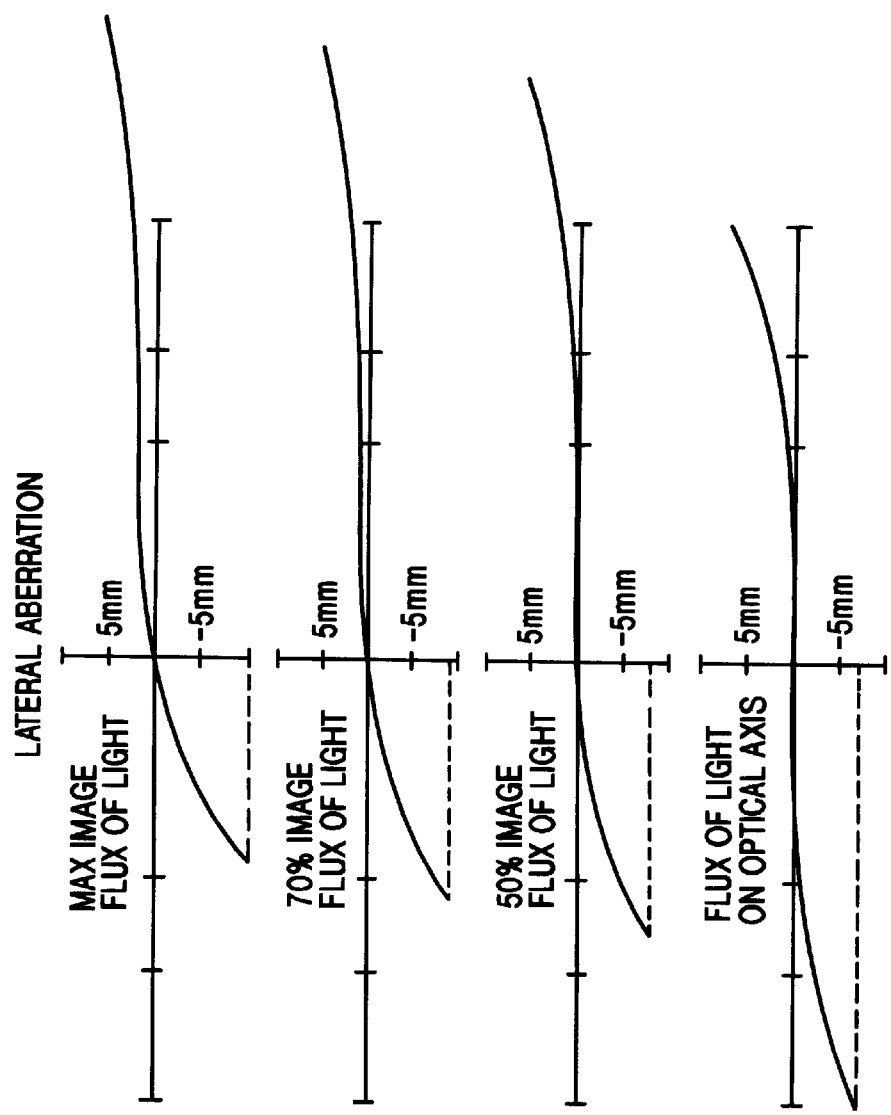
FIG. 7A illustrates lateral aberration in flux of light in an image projector in accordance with the present invention.
FIG. 7B illustrates spherical aberration (longitudinal aberration) in flux of light in an image projector in accordance with the present invention.
Figure 9:
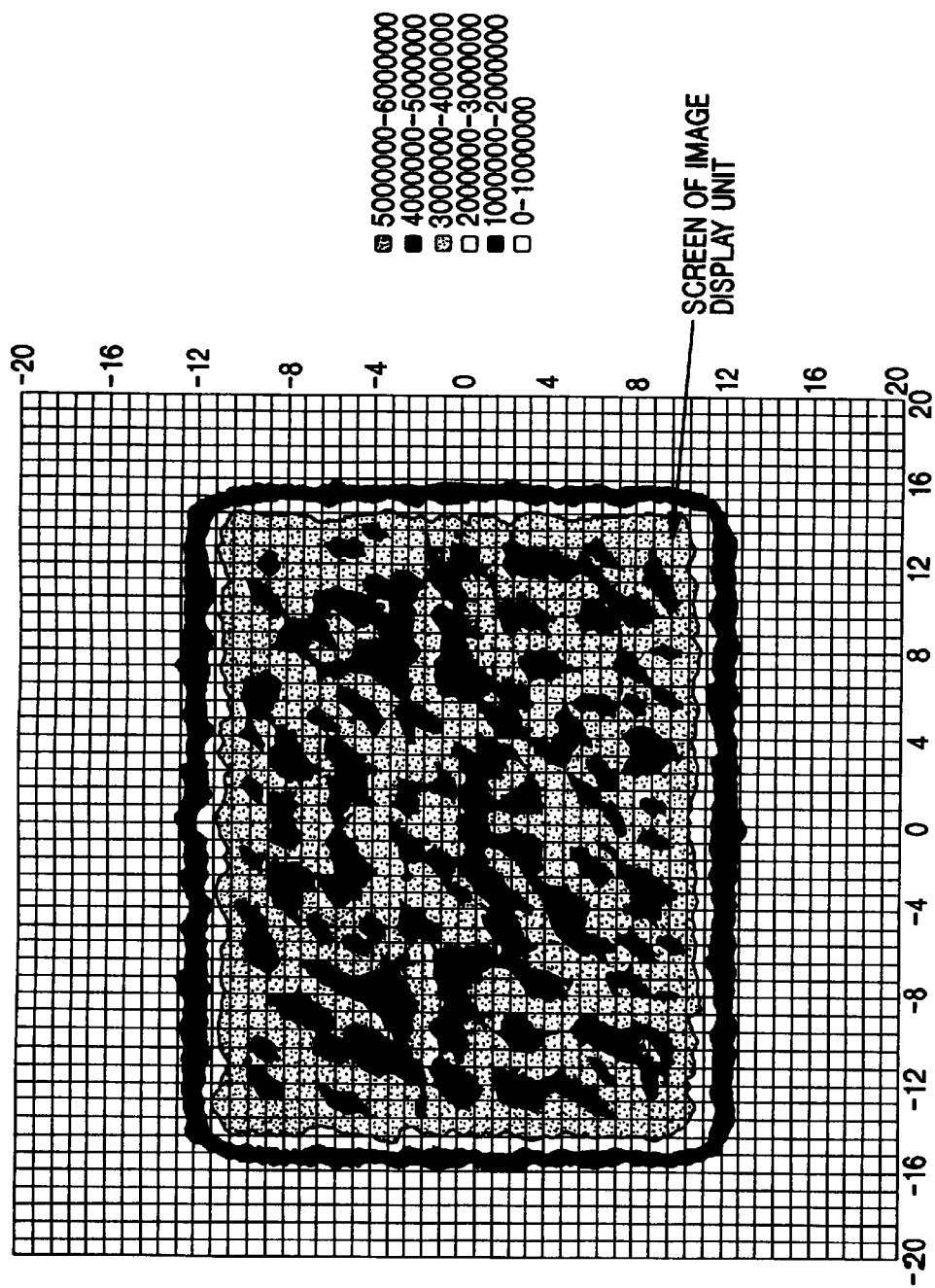
FIG. 9 illustrates a brightness distribution on an image display unit receiving flux of light passing an ordinary optical path.

FIG. 7A illustrates lateral aberration in flux of light in the first example, and FIG. 7B illustrates spherical aberration (or longitudinal aberration) in flux of light in the first example. On the other hand, FIG. 8A illustrates lateral aberration in flux of light in a conventional image projector, and FIG. 8B illustrates spherical aberration (or longitudinal aberration) in flux of light in a conventional image projector.

Comparing FIGS. 7A and 7B to FIGS. 8A and 8B, it is found out that aberration is emphasized to a greater degree in FIGS. 7A and 7B, and a converging point is closer to the light source 9.

An aberration diagram such as FIGS. 7A and 7B indicates condensation of lights on a focus. A longitudinal (or spherical) aberration diagram such as FIGS. 11A and 11B, and FIGS. 12A and 12B indicates that a portion of flux of light having a height from an optical axis is converged at an associated point.

In the first example, since aberration is emphasized, a portion of flux of light higher from an optical axis than another portion of flux of light is converged at a point closer to the light source 9 than the another portion of flux of light, as having been explained with reference to FIG. 3.

The same as mentioned above can be accomplished with respect to lateral aberration. That is, lights to be focused on a position other than an optical axis tend to be focused closer to the light source 9.

SECOND EXAMPLE

Optical elements constituting the second example of the image projector are listed in Table 2.

TABLE 2

|  | A | B | C |
|---|---|---|---|
| Reflection Mirror 12 | ※ 1 | −12 |  |
| Light Source 9 |  | 53 |  |
| First Fly Eye Lens 8a | Plane | 2.7 | Pyrex |
|  | ※ 2 | 34 | AIR |
| Second Fly Eye Lens 8b | Plane | 2.7 | Pyrex |
|  | ※ 3 | 1.2 | AIR |
| Polarizing Filter 7 | Plane | 4 | B270 |
|  | Plane | 10 | AIR |
| Condensing Lens 6 | 98 | 9 | B270 |
|  | −600 | 127.05 | AIR |
| First Relay Lens 4 | 37 | 15 | BK7 |
|  | −67 | 52.9 | AIR |
| Second Relay Lens 5 | 44 | 9.2 | F2 |
|  | −44 | 55.3 | AIR |
| Image Display Units 2a, 2b, 2c | Plane | 13.7 |  |

In Table 2, similarly to Table 1, column "A" indicates a radius of curvature R in the unit of millimeter, column "B" indicates a distance between lens surfaces in the unit of millimeter, and column "C" indicates material of which each element is made.

The reflection mirror 12 employed in the second example has the same structure as that of the reflection mirror 12 employed in the first example. That is, the reflection mirror 12 in the second example is designed to have ellipsoid of revolution (※ 1), as illustrated in FIG. 4. The reflection mirror 12 is designed to have a first focal distance FD1 of 12 mm, and a second focal distance of 650 mm.

In the second example, the reflection mirror 12 is positioned relative to the first fly eye lens 8a so that the first focus 12b of the reflection mirror 12 is spaced away from the first fly eye lens 8a by 53 mm.

The first fly eye lens 8a used in the second example has the same structure as that of the first fly eye lens 8a used in the first example (※ 2). Namely, the first fly eye lens 8a is comprised of eighty cells arranged in a matrix, as illustrated in FIG. 5A. The matrix includes ten rows each of which has eight cells (10×8 cells). Each of the cells in the first fly eye lens 8a is designed to have a radius of curvature R of 21 mm.

The second fly eye lens 8b employed in the first example has the same structure as that of the first fly eye lens 8a. Specifically, the second fly eye lens 8b is comprised of eighty cells arranged in a matrix, as illustrated in FIG. 5A. The matrix includes ten rows each of which has eight cells (10×8 cells). Each of the cells in the second fly eye lens 8b is designed to have a radius of curvature R of 21 mm.

The first relay lens 4 used in the second example is different from the first relay lens 4 used in the first example only in that the first relay lens 4 in the second example is designed to have a radius of curvature R2 of −67 mm at a second convex surface 4b closer to the second relay lens 5. The other dimensions are the same as those of the first relay lens 4 in the first example.

The second relay lens 5 in the second example is designed to have the same structure as that of the second relay lens used in the first example.

In accordance with the present invention, it is possible to uniformize a brightness distribution in an image display unit, which ensures to eliminate non-uniformity in color caused by a difference in brightness when images of the image display unit receiving the flux of light having passed the relay optical path and images of the image display unit receiving the flux of light having passed the ordinary optical path are combined to each other. This is because that aberration at a converging point is increased due to the specific structure of the first relay lens 4.

Figure 10:
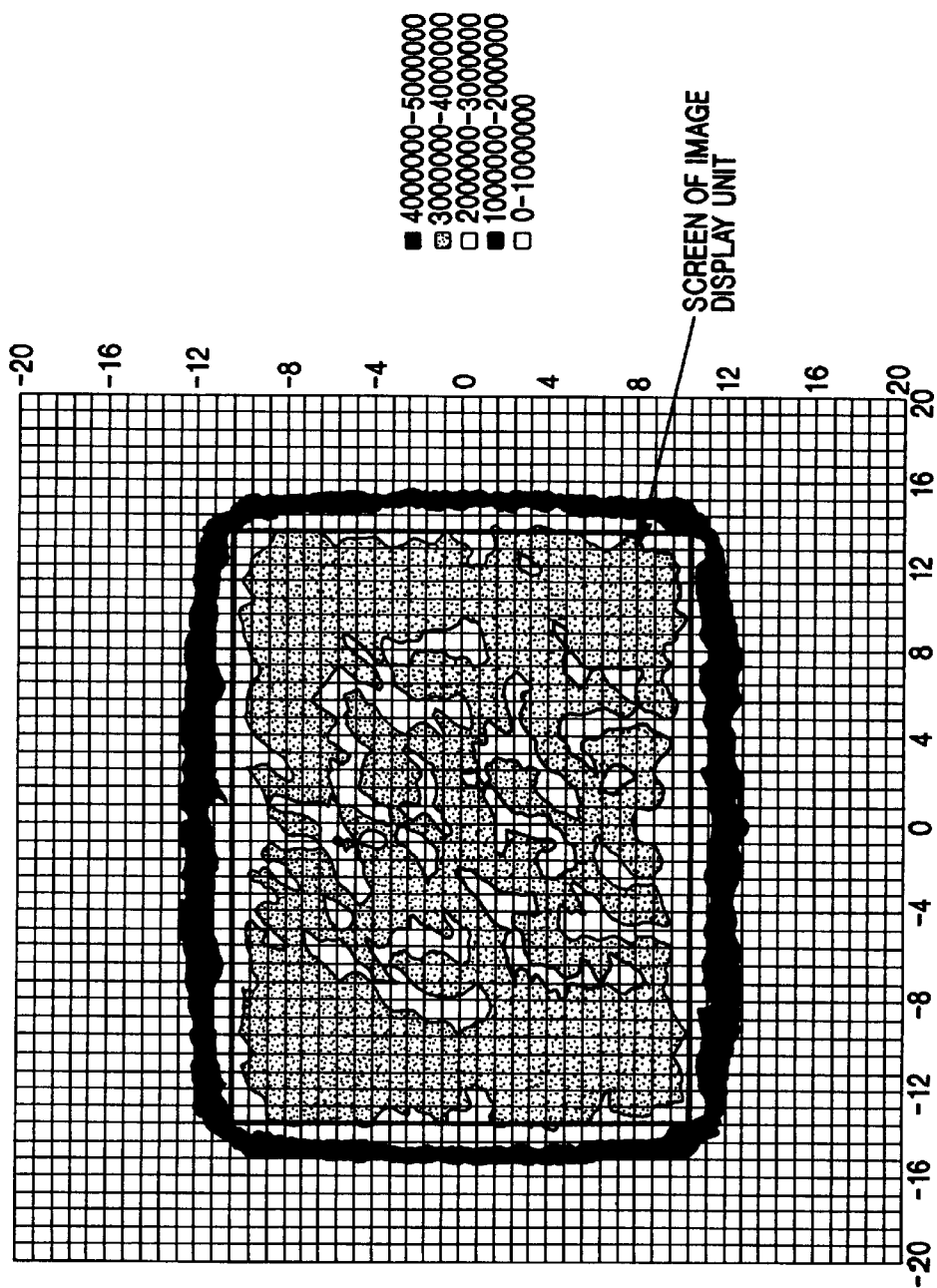
FIG. 10 illustrates a brightness distribution on an image display unit in a conventional image projector.
Figure 11A:
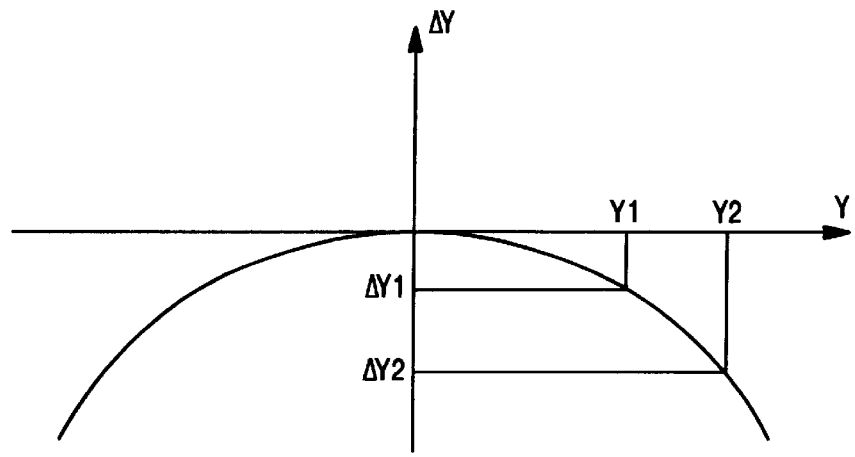
FIG. 11A illustrates lateral aberration in an image projector in accordance with the present invention.
Figure 11B:
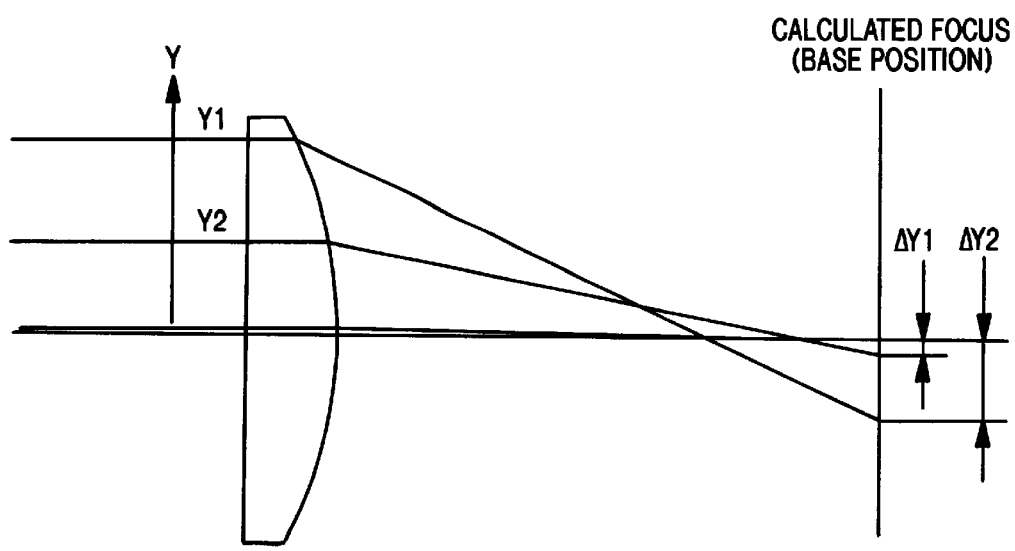
FIG. 11B illustrates a relation between an optical system and lateral aberration.
Figure 12A:
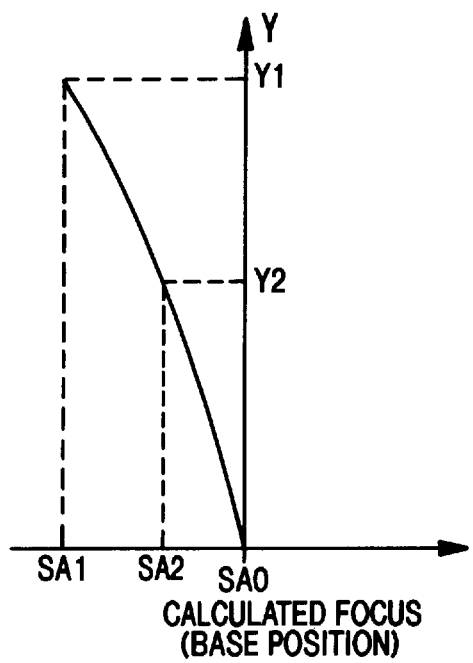
FIG. 12A illustrates longitudinal aberration in an image projector in accordance with the present invention.
Figure 12B:
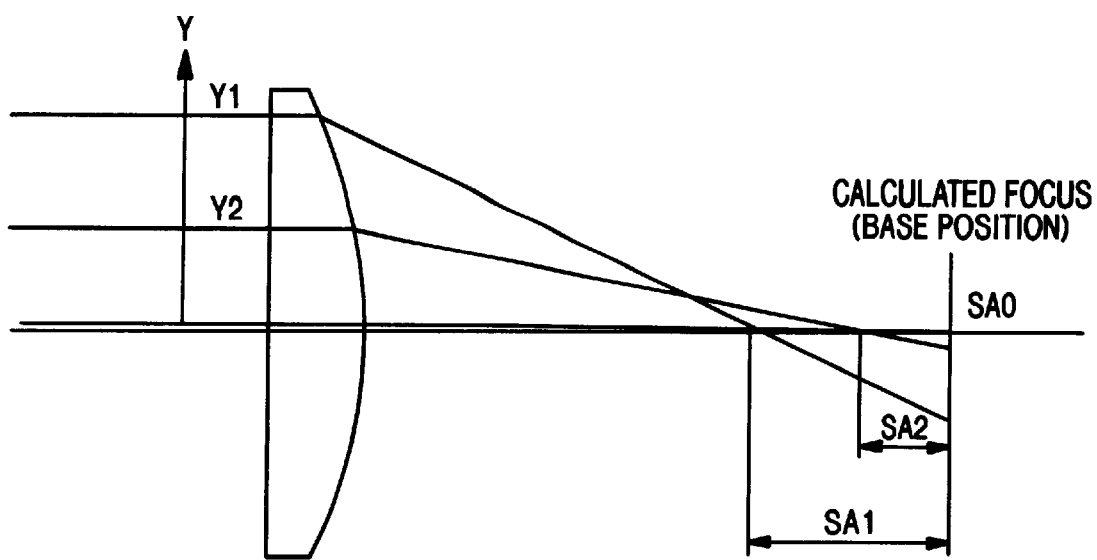
FIG. 12B illustrates a relation between an optical system and longitudinal aberration.

FIG. 10 illustrates a brightness distribution in a conventional image projector including a relay lens having the same focal distance as that of the first example. However, the relay lens is made of F2 having an index of refraction Nd of 1.62 greater than an index of refraction Nd of 1.516 of BK7 of which the relay lens 4 in the first example is made.

If two lenses have the same focal distance, but different indexes of refraction, one having a lower index of refraction would have a smaller radius of curvature. As a result, if flux of light is located close to an optical axis, there is no difference between flux of light having passed those two lenses with respect to a position where flux of light are focused. On the other hand, if flux of light is remote from an optical axis, a position where flux of light are focused varies to a greater degree due to spherical aberration in a lens having a smaller radius of curvature.

Since a focal distance of the relay lens remains unchanged, an area on which flux of light is radiated in the third image display unit 2c also remains unchanged.

In accordance with the present invention, spherical aberration of the relay lens is intentionally increased by composing the relay lens of glass having a small index of refraction. As a result, flux of light out of an optical axis is focused onto a position closer to the image display units, as illustrated in FIGS. 7A, 7B, 8A, and 8B.

With reference to FIG. 3 illustrating convergence of flux of light in the image projector in accordance with the present invention, since the relay lens 4 is designed to have increased spherical aberration, flux of light is radiated to a central area of the third image display unit 2c in a greater amount.

Figure 6:
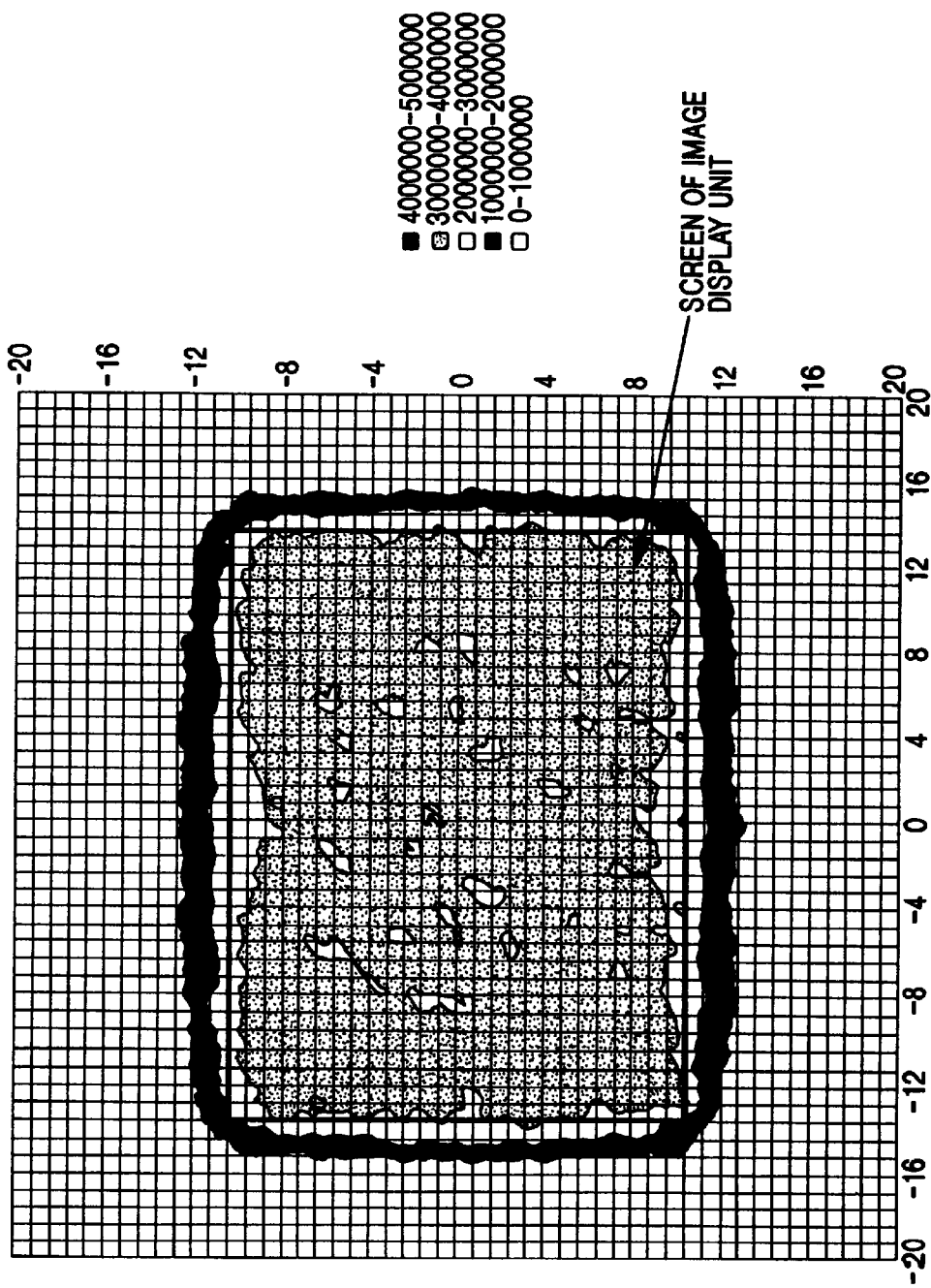
FIG. 6 illustrates a brightness distribution on an image display unit receiving flux of light passing a relay optical path in an image projector in accordance with the present invention.

As illustrated in FIG. 6, a brightness distribution on the third image display unit 2c can have almost the same uniformity as uniformity in a brightness distribution on the first and second image display units 2a and 2b receiving flux of light having passed the ordinary optical path.

On the other hand, in a conventional image projector, since a relay lens has small aberration, flux of light is radiated to a central area of the image projector in a smaller amount than the present invention. Hence, as illustrated in FIG. 10, a brightness distribution is not dense in an central area in comparison with the brightness distribution illustrated in FIG. 6.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-16073 filed on Jan. 28, 1998 including specification, claims, drawings and summary is incorporated herein by reference in its entirety.

What is claimed is:

1. An image projector comprising:
   (a) a light source;
   (b) a reflection mirror for reflecting flux of light emitted from said light source;
   (c) an image display unit for forming images; and
   (d) a relay system for transferring said flux of light to said image display unit, said relay system including a relay lens having a first convex surface through which said flux of light enters therein and a second convex surface through which said flux of light exits therefrom, a ratio of a radius of curvature of said first convex surface to a radius of a curvature of said second convex surface being determined in such a manner that aberration out of an optical axis of said relay lens is increased to thereby cause a converging point of said flux of light to displace from a calculated focal distance wherein said flux of light is converged at a location closer to said light source than the calculated focal distance.

2. The image projector as set forth in claim 1, wherein said ratio is determined in the range of about 1:2 to about 1:3.

3. The image projector as set forth in claim 1, wherein said relay lens is designed to have a focal distance in the range of about 40 mm to about 60 mm.

4. The image projector as set forth in claim 1, wherein said relay lens is made of material having an index of refraction in the range of about 1.5 to about 1.65.

5. The image projector as set forth in claim 1, wherein said reflection mirror is of ellipsoid of revolution in shape.

6. The image projector as set forth in claim 1, wherein said reflection mirror is of paraboloid of revolution in shape.

7. The image projection of claim 1 wherein said relay system comprises a lens system consisting of two lenses, said relay lens and a following bi-convex lens having at both sides convex surfaces equal in radius of curvature.

8. A relay lens to be employed in an image projector for transferring flux of light emitted from a light source, to an image display unit, said relay lens having a first convex surface through which said flux of light enters therein and a second convex surface through which said flux of light exits therefrom, a ratio of a radius of curvature of said first convex surface to a radius of a curvature of said second convex surface being determined in such a manner that aberration out of an optical axis of said relay lens is increased to thereby cause a converging point of said flux of light to displace from a calculated focal distance wherein said flux of light is converged at a location closer to said light source than the calculated focal distance.

9. The relay lens as set forth in claim 8, wherein said ratio is determined in the range of about 1:2 to about 1:3.

10. The relay lens as set forth in claim 8, wherein said relay lens is designed to have a focal distance in the range of about 40 mm to about 60 mm.

11. The relay lens as set forth in claim 8, wherein said relay lens is made of material having an index of refraction in the range of about 1.5 to about 1.65.

* * * * *